United States Patent [19]

Forsch

[11] 4,299,871
[45] Nov. 10, 1981

[54] STITCH BOND FASTENING OF COMPOSITE STRUCTURES

[75] Inventor: Hans H. Forsch, Northport, N.Y.

[73] Assignee: Grumman Aerospace Corporation, Bethpage, N.Y.

[21] Appl. No.: 72,259

[22] PCT Filed: Apr. 16, 1979

[86] PCT No.: PCT/US79/00240

§ 371 Date: Sep. 4, 1979

§ 102(e) Date: Sep. 4, 1979

[87] PCT Pub. No.: WO80/02254

PCT Pub. Date: Oct. 30, 1980

[51] Int. Cl.³ .................... B32B 7/08; B64C 3/26
[52] U.S. Cl. ................................. 428/104; 52/764;
112/262.1; 112/423; 112/440; 156/92; 156/93;
156/253; 244/123; 244/132; 428/102; 428/119;
428/120
[58] Field of Search .............. 52/764, 765; 112/262.1,
112/423, 438, 440; 156/91, 93, 253, 92;
244/123, 132; 428/102, 104, 119, 120

[56] References Cited

U.S. PATENT DOCUMENTS

| | | | |
|---|---|---|---|
| 1,504,817 | 8/1924 | Fokker | 244/132 |
| 1,519,772 | 12/1924 | Dürr | 244/132 |
| 1,901,864 | 3/1933 | Bellanca | 244/132 |
| 2,053,048 | 9/1936 | Robinson | 244/132 |
| 2,140,558 | 12/1938 | Schmidt | 244/132 |
| 2,161,802 | 6/1939 | DeGanahl | 244/123 X |
| 2,483,916 | 10/1949 | Lysak | 244/132 |
| 2,683,679 | 7/1954 | Hurd et al. | 156/93 X |
| 2,737,227 | 3/1956 | Brummel | 156/93 X |
| 2,808,355 | 10/1957 | Christie et al. | 156/108 X |
| 3,468,274 | 9/1969 | Koffler | 112/262.1 |
| 3,996,084 | 12/1976 | Holmes | 156/93 |
| 4,059,468 | 11/1977 | Bouillon | 156/93 |
| 4,133,711 | 1/1979 | August et al. | 156/353 |
| 4,206,895 | 6/1980 | Olez | 244/123 |

FOREIGN PATENT DOCUMENTS 557694 12/1943 United Kingdom .

Primary Examiner—Robert A. Dawson
Attorney, Agent, or Firm—Richard G. Geib; Mellor A. Gill

[57] ABSTRACT

An integrated composite structure 100 that uses fasteners 116 or bonds in shear and stitching 104, 106 in tension to assemble the structure and provide for load transfer from one to the other that is assembled by a process of orienting the various structures while tacky and warming same to accept stitching 104, 106 with the structures so joined being thereafter cured.

14 Claims, 12 Drawing Figures

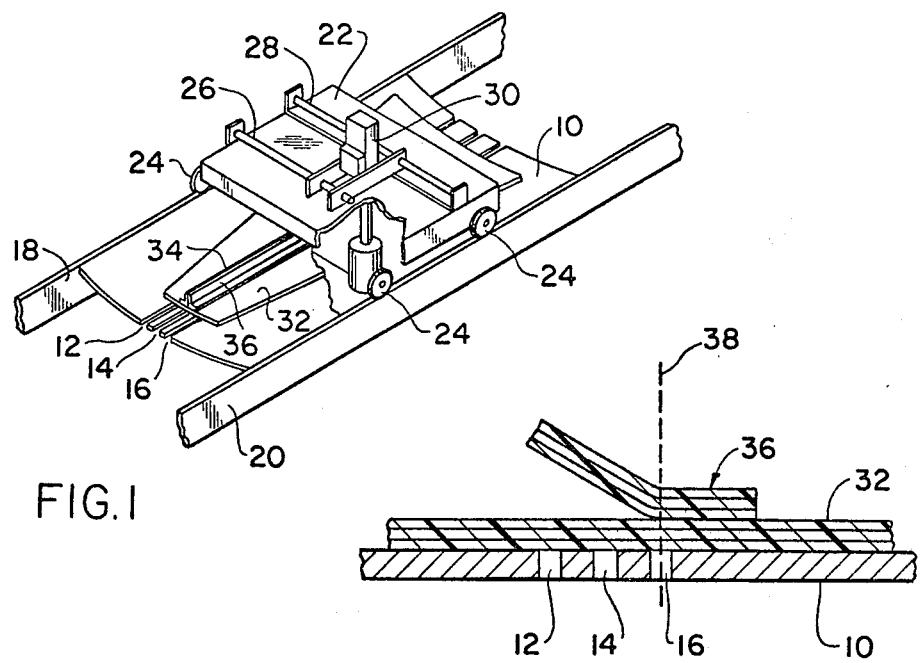
FIG. 1
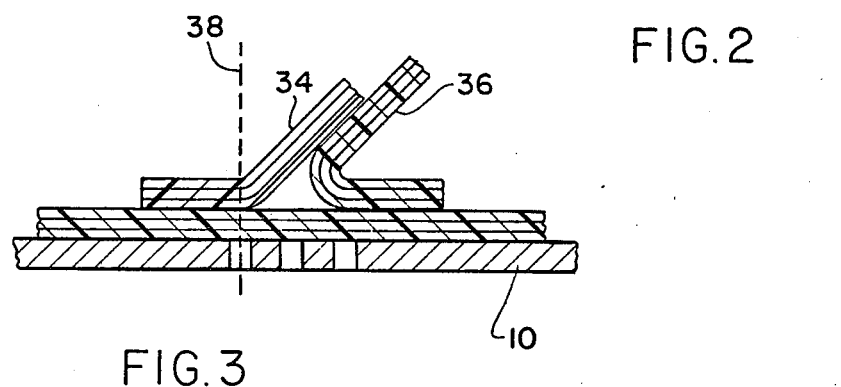
FIG. 2
FIG. 3
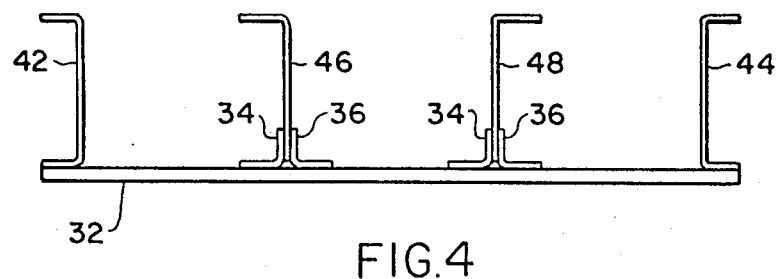
FIG. 4

STITCH BOND FASTENING OF COMPOSITE STRUCTURES

The Government has rights in this invention pursuant to Contract No. F33615-75-C-3124 awarded by the Department of the Air Force.

Applicant claims priority of Apr. 16, 1979, the date of filing of his International Patent Application Ser. No. PCT/US 79/00240 under the Patent Cooperation Treaty in the United States Patent and Trademark Office designating the United States of America as a designated country along with other countries.

BACKGROUND

Since the earliest of days in the application of skin coverings for load carrying structure, especially in the art of airplane construction, those skilled in the art have sought for fasteners that would accommodate shear and tensile loading between skin and its substructure.

In the prior art, one can observe U.S. Pat. Nos. 1,504,817; 1,519,772; 1,901,864; 2,053,048; 2,161,802 and 2,483,916 as examples of how one can use stitching to fasten a skin to a substructure. In these, one is taught to use an intermediate tape or the like that is attached to such substructure and the skin is fastened to the tape by stitching.

Those skilled in the art today have, however, come to rely on mechanical fasteners. They have become so dependent upon such that it is unheard of to attempt any other form of fastening. To follow this practice in composite structure fastening drives the cost of final assembly upwards because of special drilling and reinforcement requirements and the use of fasteners made from more expensive materials to prevent serious corrosion problems in service.

Nevertheless, the present day fastener fraternity, when asked to study assembly of new materials, consider it to be revolutionary to address the problem of composite structure assembly with other than today's conventional, mechanical fasteners or bonding techniques. Therefore, it is the intent of this disclosure to teach such skilled in the art how to take a leaf from the past and improve upon it so as to avoid expensive techniques that are not-required.

BRIEF DESCRIPTION OF THE DRAWINGS

FIG. 1 is an isometric showing of an assembly station for stitching a composite panel to composite substructure;

FIG. 2 is a broken section of a composite panel and substructural attachment in process of being stitched together on the support of FIG. 1;

FIG. 3 is a broken section of the composite panel and substructure of FIG. 2 to which another composite substructure is being assembled per this invention;

FIG. 4 is an end view of a composite panel and substructure assembled in accordance with this invention;

DETAILED DESCRIPTION OF THE DRAWINGS

Figure 5:
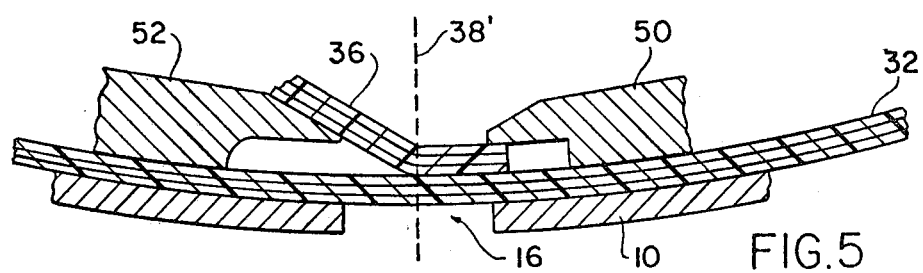
FIG. 5 is an enlarged broken section of the panel assembly possible with the apparatus of FIG. 1.

With particular reference now to FIG. 1, there is shown an assembly station that comprises a form support 10 having slots 12, 14 and 16. The support is held between two rails 18 and 20. A platform 22 is provided with wheels (i.e., 24) that will hold the platform to the rail and control its movement therealong. It is desired that numerical control devices be utilized with motors on the platform to control its movement along the rail means, all as possible by one skilled in the art of modern day machinery.

On the platform on rods 26 and 28 is a Landis Model 77 chain stitcher 30 familiar to those skilled in the art of leather stitching. Stitcher 30 is provided also with means to control side to side motion of it relative to the platform. One such means (not shown) within the knowledge of one skilled in the art is to have gear racks on the side of the rods with gears synchronously driven on the stitcher support. In any event, the stitcher 30 demonstrated has the capability of sewing various thickness of filament reinforced composite materials and large components; i.e., wing panels; i.e., panel 32 and beam caps 34 and 36 as shown.

A better idea of the stitching technique is shown with reference to FIG. 2 where the panel 32 has laid thereover several laminations that are to comprise beam cap 36. This lay-up is while the composites are still in the "wet" (tacky) state. The stitcher then sews along an axis through the slot 16, as shown by dash line 38. Thereafter, the stitcher is moved over to repeat the sewing process for the adjacent beam cap 34 (see FIG. 3). In these sewing steps, the vertical stand of the beam caps 36 and then 34 are laid over to open up the stitch area. This will be further described with reference to FIG. 5 hereinbelow.

Now with reference to FIG. 4, there is shown a completed composite panel and substructure possible with this invention showing panel 32 with end caps 42 and 44 and intermediate webs 46 and 48 for the beam caps 34 and 36 as shown.

Getting back to the assembly technique, there is shown in FIG. 5 the composite panel 32 laid upon the support 10 and the composite beam cap 36 laid thereover to lie under one edge 50 and over another edge 52 of a sewing guide. Stitching takes place along the dash line 38' as in FIG. 2.

Figure 6:
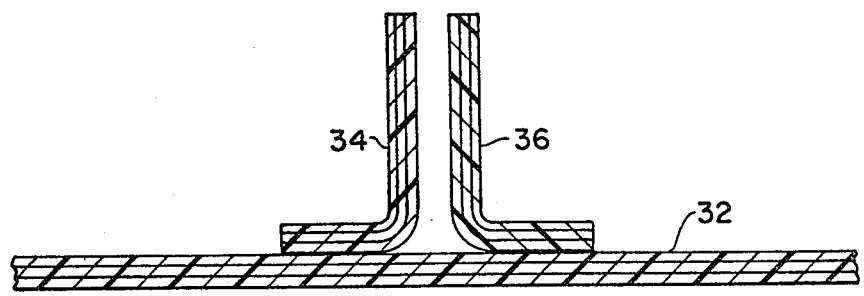
FIG. 6 is an enlarged broken section of a composite panel and substructure assembled per this invention so as to be mated to further substructure.
Figure 7:
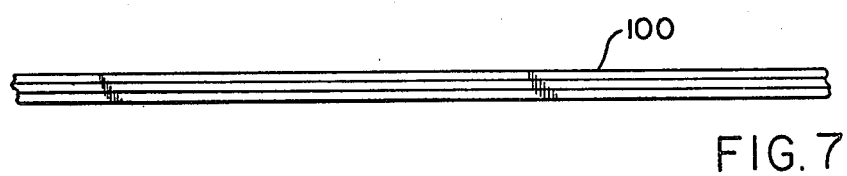
FIGS. 7, 8 and 9 are illustrations of a sequence of assembly steps possible with this invention showing another assembly variant for the composite panel and substructure shown in a broken end view.
Figure 8:
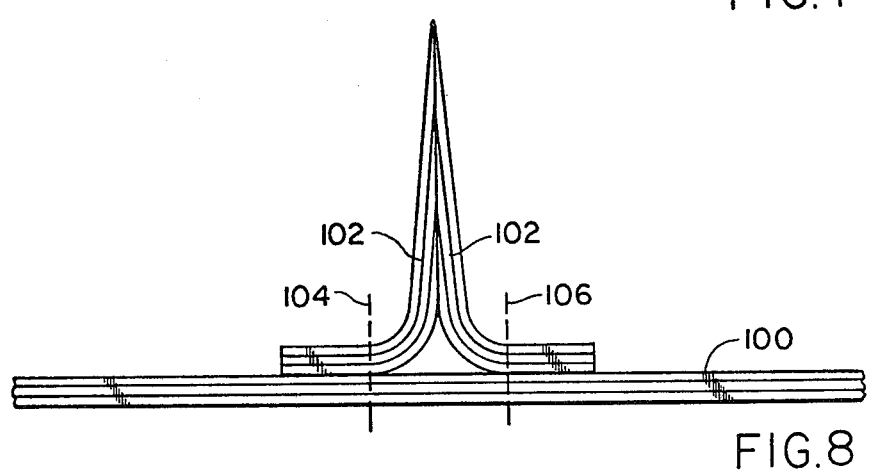
Figure 9:
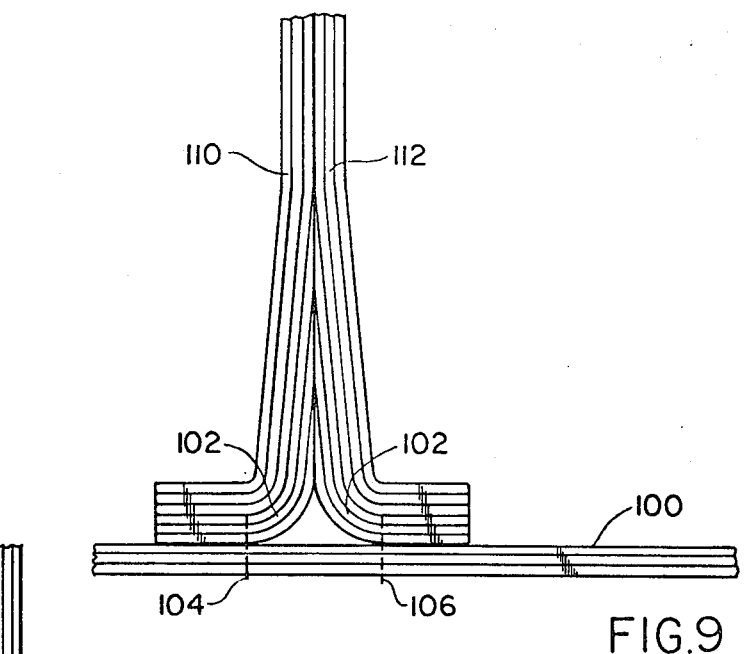

With reference to FIG. 6, there the panel 32 and beam caps 34 and 36 are shown ready to accept a web; i.e., 46 or 48 as seen by FIG. 4. The caps 34 and 36 are stitched (shown by dash lines 38) to the panel such that any tensile loading is carried by the stitching. It should be noted that as the stitching may be completed while the materials are still "wet" (tacky) so-to-speak, there will be additional bond lines between not only the composite materials, but between the materials and the stitching. Depending on the nature of the composite materials, threads used for this stitching have so far comprised graphite, nylon, fiberglass, polyester, KEVLAR.

As examples of another variant of a process to make a composite panel and substructure according to this invention, are the FIGS. 7 through 11. As can be seen, one starts with a composite panel 100 formed by a predetermined lay-up of graphite, fiberglass, nylon, polyester, KEVLAR filament reinforced resin matrix (either thermoplastic or thermosetting). See Assignee's U.S. Pat. No. 4,133,711 for a process to lay-up such a panel. To that, one stitches either the beam caps as aforedescribed, or in the modification shown a slug 102 of composite material of similar construction as panel 100. These elements are stitched "dry" or "wet", as desired, but heated along an axis represented by dash lines 104 and 106 between 130° F. and 150° F. to either side of the vertical projection. Next formed composite web elements 110 and 112 are laid over the lateral surfaces and up the surfaces of the vertical projection and held thereto and thereabove to each other by a bonding agent, and then this lay-up is cured by means and at temperatures known to one skilled in the art.

Figure 10:
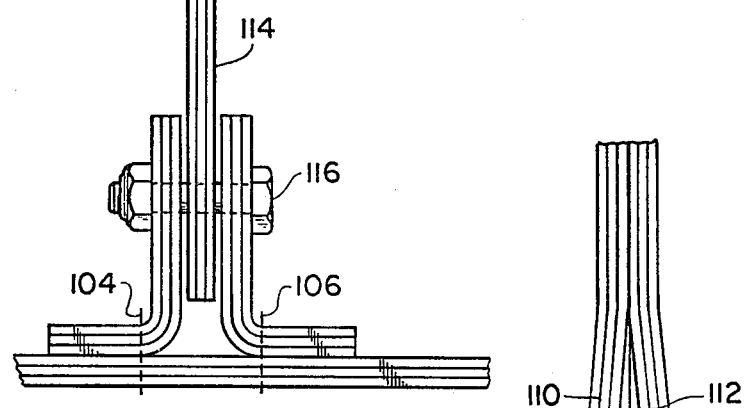
FIG. 10 is another assembly possible with this invention.

With references to FIG. 10, a web 114 is inserted between beam caps 104 and 106. A bonding agent is used to hold the web in place and a series of fastener locations are machined through the beam caps and web. This assembly is then completed as shown by FIG. 10 by inserting a mechanical fastener 116 through beam caps 110 and 112 with web 114 interposed.

Figure 11:
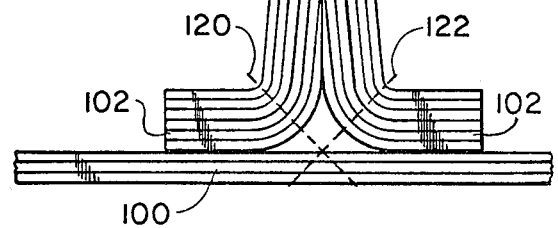
FIG. 11 is still another variant of the assembly possible with this invention.

It should be noted in reference to FIG. 11, that it is possible to delay stitching of the slug 102 and panel 100 to a time after locating of web elements 110 and 112 thereto. Further such stitching could also be on the diagonals of dash lines 120 and 122 to accommodate a wider variety of tensile loadings between the panel 100 and its substructure.

Figure 12:
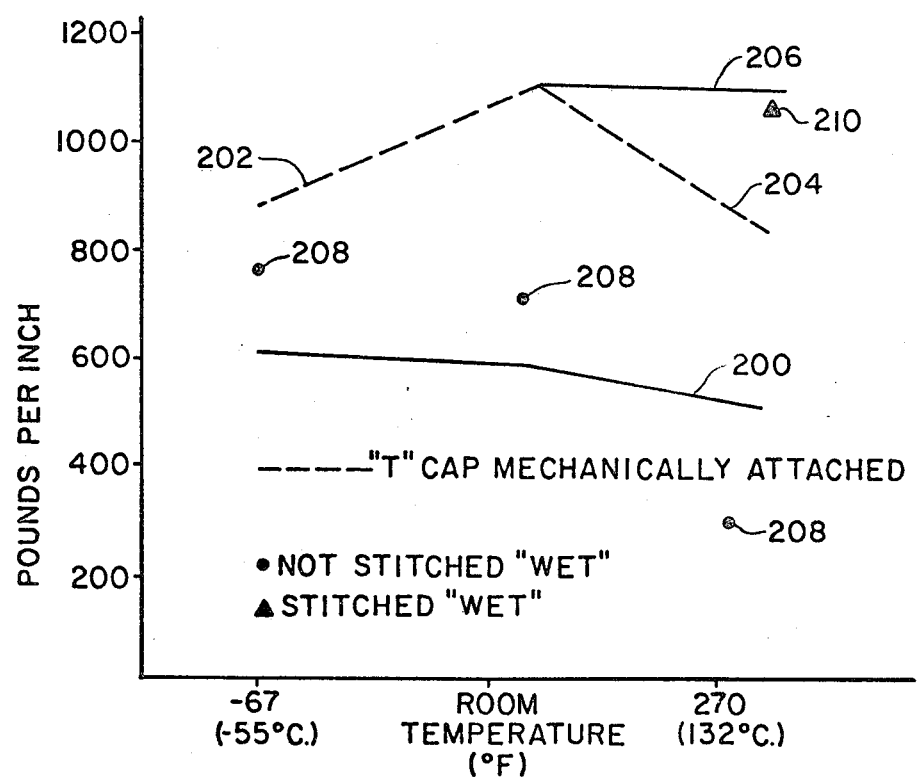
FIG. 12 is a graphical illustration of the improved characteristics possible with this invention in view of the more common techniques of fastening.

With final reference to the drawings, FIG. 12 shows a graphical form the heretofore unrecognized advantages of this invention in assembly of composites. Line 200 represents a composite assembly of the elements above-described without stitching. Line 202 represents such structure mechanically assembled and stitch assembled. Line 204 represents a composite assembly by way of mechanical fasteners above room temperature, and line 206 is representative of the same assembly using instead of mechanical fasteners, the stitching process hereby disclosed. Points 208 represent characteristics of non-stitched (bonded only) composite assembly exposed to a wet environment. Point 210 is representative of the high temperature characteristic for a stitched composite assembly.

As illustrated by FIG. 12, the tensile characteristics investigated were for an environment from −67° F. to 270° F. and illustrates the tensile load capability dry and wet.

In the constructions to date, they have all exhibited the ability to accommodate, better than mechanical fastening or bonding, the high-stress concentrations under the beam caps that are caused primarily by the bending of the panel and mismatching of axial strains at adjacent faces of panel and substructure. With this invention, the combined flatwise tension, transverse tension and shear stresses are all accommodated and even when failed in local areas, the stitches act as a form of crack stopper to the spread of assembly failure. In other words, with this invention, it is possible to realize in composite panel and substructure assembly an ultimate strength for such assembly independent of bond failure load limitations. As such, it is now possible in following this invention to use composites in environments where they have to resist torsion and pressure; i.e., a wing skin about a fuel tank.

Having described the structural assembly of this invention with several preferred techniques to obtain same, it is now desired to set forth the claims for these Letters Patent as follows:

I claim:

1. In a structural assembly a means of joining the various elements that will optimize the absorption of joint loading, said assembly comprising:
    a composite panel;
    a composite beam cap;
    a bonding means to localize the cap on the panel; and
    stitching from one side of the panel through the panel and beam cap to the exterior thereof and returning through the beam cap and panel and continuing in like fashion along a line with said stitching reinforcing the bonding means to accommodate joint loadings directionally destructive to the bonding means to complete the assembly.

2. A means to assemble a panel to a substructure, said means including:
    a composite panel;
    at least one beam cap of similar composite material for attachment to said composite panel;
    a bonding means between the panel and the beam cap; and
    stitching from one side of the panel through the panel and passing through the beam cap to the exterior thereof and returning through the beam cap and panel and continuing in like fashion along a line such that said stitching is reinforcing the bond means by forcing shear loading only of the bond means.

3. In a structural assembly, a means of joining the various elements that will optimize the transfer of load from one element to another, said assembly comprising:
    a panel of composite material;
    a web for said panel, said web being also of composite material;
    a slug interposed with said panel and said web; and
    means to bond said panel, web and slug together, said means including an adhesive therebetween for shear loading and stitching extending from one side of the panel through the panel and at least the slug to the exterior of the slug and returning through said slug and panel to the exterior of the panel while progressing along a stitch line, said stitching between at least the panel and slug precluding bond impairment by reason of flatwise tensile or transverse tensile loading.

4. In a composite structural assembly, a means of joining a plurality of elements that will optimize transfer of load from one element to another, said assembly comprising:
    a panel;
    a beam cap for said panel;
    a web to be attached to said panel via said beam cap; and
    a bonding means with a line of stitches from one side of the panel through both the panel and beam cap to the exterior of the beam cap and returning through the beam cap and panel and continuing in like fashion to sew the assembly of at least the panel and beam cap, said bonding means also including means attaching the beam cap and web.

5. The assembly of claim 4 and further comprising mechanical fastener means reinforcing said further bonding means attaching the beam cap and web.

6. The assembly of claim 4 wherein the stitches are at an angle to vertical stand and horizontal leg of the beam cap.

7. The assembly of claim 6 wherein the bonding means includes a slug as the beam cap.

8. The assembly of claim 7 wherein the web overlays completely the vertical stand and horizontal leg of said slug such that the bonding means is loaded in shear for in-plane loads and in shear for loads normal thereto.

9. A process for sewing a composite panel to an understructure, said process comprising:
   placing the panel on a support having slots;
   placing a first finite width composite "L" shaped understructure on said panel;
   opening a stitching line over the slots and along an axis of the understructure by bending back a vertical stand of the understructure;
   running a stitching apparatus along the line to stitch through the panel and first understructure and returning through the first understructure and panel along the line in bringing together the panel and the first understructure;
   curing the panel and first understructure as stitched together; and
   removing said panel from said support.

10. The process of claim 9 and further comprising prior to the curing step additional steps:
    placing a second finite width composite "L" shaped understructure on said panel such that its vertical stand and that of the first understructure are adjacent each other;
    opening a stitching line over the slots of the support and along an axis of the second understructure by bending back the vertical stand of the second understructure over the vertical stand of the first understructure; and
    running a stitching apparatus along the line to stitch through the panel and second understructure and returning through the second understructure and panel along the line in bringing together the panel and the second understructure.

11. The process of claim 10 wherein the panel and substructure are warmed prior to stitching.

12. The process of claim 11 wherein the panel and first substructure and second substructure are warmed prior to stitching.

13. The process of claim 10 wherein the curing is under pressure and heat.

14. A structural assembly of composite articles, said assembly being characterized as:
    a composite panel;
    composite structural elements for said panel; and
    means to sew from one side of said panel through said panel and elements to the exterior of said elements continuing along a line on said panel such that stitches through the panel from one side and the elements on the other side will provide a tensile load path between the panel and composite structural elements.

* * * * *